(No Model.)

L. McCARTHY.
INSULATING COUPLING FOR ELECTRIC WIRE CONDUITS.

No. 592,016. Patented Oct. 19, 1897.

Witnesses:
Oscar F. Hill
Lepine Hall Rice

Inventor:
Louis McCarthy
by Macleod Calver & Randall
Attorneys.

UNITED STATES PATENT OFFICE.

LOUIS McCARTHY, OF BOSTON, MASSACHUSETTS.

INSULATING-COUPLING FOR ELECTRIC-WIRE CONDUITS.

SPECIFICATION forming part of Letters Patent No. 592,016, dated October 19, 1897.

Application filed July 2, 1897. Serial No. 643,207. (No model.)

*To all whom it may concern:*

Be it known that I, LOUIS MCCARTHY, a citizen of the United States, residing at Boston, in the county of Suffolk and State of Massachusetts, have invented certain new and useful Improvements in Insulating-Couplings for Electric-Wire Conduits, of which the following is a specification, reference being had therein to the accompanying drawings.

The invention consists of an insulating coupling or joint of novel and useful character or construction, the same being adapted more particularly for use in connection with conduits and the like containing electric conducting-wires, although intended to be used in other connections as well, as circumstances may render advisable.

I will describe the invention first with reference to the accompanying drawings, in which latter I have illustrated the best embodiments of the invention which I have yet contrived, after which I will particularly point out and distinctly define the distinguishing characteristics of the invention in the claims at the close of this specification.

Figure 1:
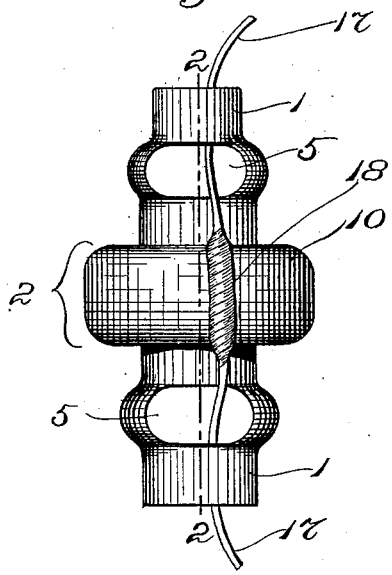
Figure 2:
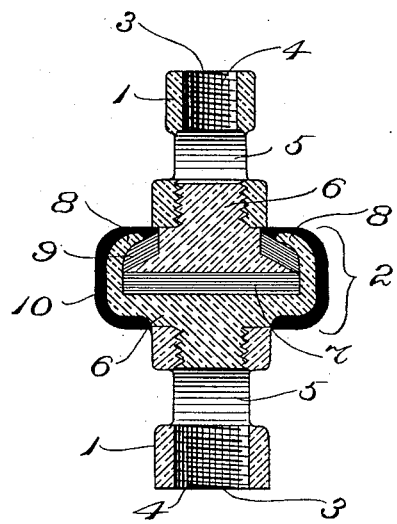
Figure 3:
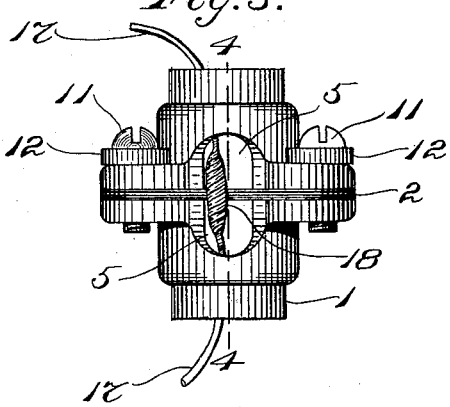
Figure 4:
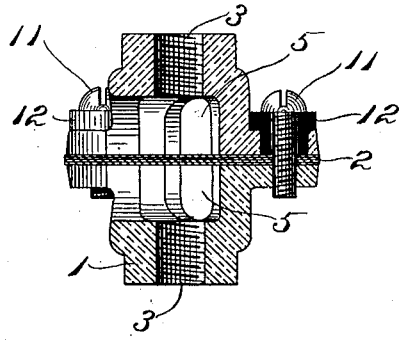

Figure 1 of the drawings shows in elevation an insulating coupling or joint embodying the invention. Fig. 2 shows the same in vertical section on the dotted line 2 2 of Fig. 1. Fig. 3 is a view in elevation of a second form of coupling or joint embodying the invention. Fig. 4 shows the same in vertical section on the line 4 4 of Fig. 3.

My device comprises, essentially, the opposite connections 1 1 and the interposed insulator 2. The connections 1 1 are constructed suitably for application and attachment to the parts which are to be joined by the coupling. In the illustrated embodiments of the invention the outer end portions thereof are screw-threaded interiorly, as at 4, to fit upon the correspondingly-threaded exteriors of the ends of the parts to which they are to be applied, although the attachment of the coupling to the conduits, or the like, may be provided for otherwise. The said connections are made hollow or tubular, so that the central passages 3 3 thereof shall constitute continuations of the interior spaces of the parts which are joined by the coupling, and each connection has one or more lateral passages 5 5 extending from the central passage 3 thereof to the exterior of the connection. The foregoing construction enables hollow conduits containing electric conducting-wires 17 17 to be joined by means of the coupling, and permits the ends of the wires 17 17 which are contained within the said hollow conduits to be extended into the central passages 3 3 of the respective connections and then to be drawn to the exterior through the lateral passages 5 5 and passed around the exterior of the insulator 2, the said ends being united in known manner, usually at the exterior of the said insulator, as at 18, Figs. 1 and 3.

In the embodiment of the invention which is represented in Figs. 1 and 2 the insulator comprises two flanged pins 6 6, the heads of which are separated by an interposed layer 7 of sheet mica or other suitable insulating material. The flange of one of the said pins is furnished with a lip 8, which is bent down, so as to overlie the flange of the other pin, a ring or washer 9 of insulating material—mica, for instance—being interposed between the bent-over portion of the said lip 8 and the flange which it incloses and all being firmly clasped together by the compression of the lip upon the said ring or washer 9. A covering or casing 10 of plastic insulating material incases the main portion of the insulator, so as to cover and protect the flanges and lip aforesaid. The oppositely-projecting stems of the pins 6 6 are screw-threaded, and the adjacent portions of the connections 1 1 are interiorly threaded to fit upon the said threaded stems. In the foregoing construction it will be seen that the connections are removably united or applied to the pins 6 6 of the insulator. This enables the said connections to be unscrewed from the insulator and separately applied to the ends of the respective parts which are to be joined, the parts of the coupling subsequently being reunited.

In the embodiment of the invention which is represented in Figs. 3 and 4 the insulator 2 consists of a suitable thickness of sheet mica interposed between the proximate portions of the connections 1 1, the said portions having outwardly-projecting lugs, through holes in which are passed the screws or bolts 11 11, by which the various parts are bound together. Thimbles 12 12 of insulating material are interposed between the heads and stems of the said screws or bolts and the adjacent sides of the holes through which said screws pass in the lugs of one connection, while the holes in the lugs of the other connection are internally threaded to fit the threads of the screws or bolts.

I claim as my invention—

1. An insulating-coupling comprising opposite connections made hollow or tubular for the reception of conducting-wires, and an interposed insulator, and having at opposite sides of the insulator lateral passages to permit the said wires to be withdrawn and passed around the exterior of the insulator, substantially as described.

2. An insulating-coupling comprising opposite connections made hollow or tubular for the reception of conducting-wires, and an interposed insulator to which said connections are applied removably, the said connections respectively having lateral passages to permit the said wires to be withdrawn and passed around the exterior of the insulator, substantially as described.

In testimony whereof I affix my signature in presence of two witnesses.

LOUIS McCARTHY.

Witnesses:
CHAS. F. RANDALL,
WILLIAM A. COPELAND.